United States Patent
Kish (10) Patent No.: US 10,595,269 B2
(45) Date of Patent: Mar. 17, 2020

(54) PROVISIONING RADIOS ASSOCIATED WITH ACCESS POINTS FOR TESTING A WIRELESS NETWORK

(71) Applicant: ARRIS Enterprises LLC, Suwanee, GA (US)

(72) Inventor: William S. Kish, Sunnyvale, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 15/388,290

(22) Filed: Dec. 22, 2016

(65) Prior Publication Data
US 2017/0105173 A1    Apr. 13, 2017

Related U.S. Application Data

(63) Continuation of application No. PCT/US2014/072363, filed on Dec. 24, 2014.

(60) Provisional application No. 62/016,546, filed on Jun. 24, 2014.

(51) Int. Cl.
| | |
|---|---|
| *H04W 48/20* | (2009.01) |
| *H04W 24/08* | (2009.01) |
| *H04L 12/24* | (2006.01) |
| *H04L 29/12* | (2006.01) |
| *H04W 4/06* | (2009.01) |
| *H04W 72/04* | (2009.01) |
| *H04W 48/12* | (2009.01) |

(52) U.S. Cl.
CPC ............ *H04W 48/20* (2013.01); *H04L 41/22* (2013.01); *H04L 61/6022* (2013.01); *H04W 4/06* (2013.01); *H04W 24/08* (2013.01); *H04W 72/0453* (2013.01); *H04W 48/12* (2013.01)

(58) Field of Classification Search
CPC ... H04W 48/20; H04W 72/0453; H04W 4/06; H04W 24/08; H04W 48/12; H04L 41/22; H04L 61/6022
See application file for complete search history.

(56) References Cited

U.S. PATENT DOCUMENTS

| | | | |
|---|---|---|---|
| 7,539,489 B1 * | 5/2009 | Alexander | ............ H04W 24/06 455/423 |
| 9,397,922 B1 * | 7/2016 | Collins | .................... H04L 43/50 |

(Continued)

OTHER PUBLICATIONS

PCT International Search Report of PCT/US14/72363 dated Apr. 22, 2015; (2 pgs.).

(Continued)

*Primary Examiner* — Ivan O Latorre
(74) *Attorney, Agent, or Firm* — Myers Bigel, P.A.

(57) ABSTRACT

Methods and systems for provisioning unique identifiers to a plurality of access points (APs) in a wireless network and radios associated thereto is provided. By utilizing a testing apparatus in communication via a network with the APs, the methods and systems assign a unique radio test identifier for an AP in the plurality of APs and provisions the AP radio associated with the AP in the plurality of APs with the corresponding unique radio test identifier. The testing apparatus has a provisioning mode that can be switched on or off. Also provided are a system for provisioning the unique identifiers and applications thereof; for example, in testing and providing maintenance of APs.

17 Claims, 6 Drawing Sheets

(56) References Cited

U.S. PATENT DOCUMENTS

| | | | | |
|---|---|---|---|---|
| 2003/0162504 A1* | 8/2003 | Sabongi | | H04W 24/00 455/67.11 |
| 2005/0148326 A1* | 7/2005 | Nogawa | | H04L 41/0806 455/420 |
| 2005/0249235 A1 | 11/2005 | Lee | | |
| 2006/0104230 A1* | 5/2006 | Gidwani | | H04W 84/00 370/328 |
| 2008/0057967 A1 | 3/2008 | Goldsmith | | |
| 2008/0186882 A1* | 8/2008 | Scherzer | | H04W 72/02 370/310 |
| 2009/0201916 A1* | 8/2009 | Caron | | H04L 12/66 370/352 |
| 2011/0249198 A1* | 10/2011 | D'Alessio | | H04N 5/74 348/744 |
| 2011/0257923 A1* | 10/2011 | Boulton | | G01S 5/0221 702/117 |
| 2011/0286437 A1 | 11/2011 | Austin et al. | | |
| 2012/0044915 A1* | 2/2012 | Oerton | | H04W 24/02 370/338 |
| 2012/0213211 A1* | 8/2012 | Remaker | | H04L 63/0421 370/338 |
| 2012/0257536 A1* | 10/2012 | Kholaif | | H04W 48/20 370/254 |
| 2012/0257753 A1* | 10/2012 | Ochikubo | | H04W 12/02 380/270 |
| 2013/0051303 A1* | 2/2013 | Huang | | H04W 48/12 370/312 |
| 2013/0143555 A1* | 6/2013 | Singh | | H04W 36/0077 455/434 |
| 2013/0150012 A1* | 6/2013 | Chhabra | | H04W 48/16 455/418 |
| 2014/0254390 A1* | 9/2014 | Ansley | | H04W 24/10 370/241 |
| 2014/0370879 A1* | 12/2014 | Redding | | H04W 4/001 455/419 |
| 2015/0098459 A1* | 4/2015 | Lee | | H04W 48/14 370/338 |
| 2015/0117414 A1* | 4/2015 | Tang | | H04W 36/08 370/332 |
| 2015/0189511 A1* | 7/2015 | Lapidous | | H04L 63/0272 726/15 |
| 2015/0207578 A1* | 7/2015 | Ramamurthy | | H04W 72/0453 370/338 |
| 2015/0230109 A1* | 8/2015 | Socaciu | | H04W 64/00 455/418 |
| 2015/0333965 A1* | 11/2015 | Lee | | H04L 45/02 370/254 |
| 2016/0286469 A1* | 9/2016 | Wang | | H04W 48/16 |
| 2017/0339584 A1* | 11/2017 | Ketonen | | H04L 41/5019 |
| 2017/0339630 A1* | 11/2017 | Ketonen | | H04W 48/16 |

OTHER PUBLICATIONS

PCT Written Opinion of the International Searching Authority of PCT/US14/72363 dated Apr. 22, 2015; (9 pgs.).

PCT International Preliminary Report on Patentability of PCT/US14/72363 dated Dec. 27, 2016; (1 pg.).

Taiwanese (R.O.C) counterpart patent application No. 103146285, office communication dated Jun. 25, 2018 (14 pgs.).

Official Action, Re:Taiwan Application No. 103146285, dated Mar. 4, 2019.

* cited by examiner

Access Point

FIG. 2A

Controller

PROVISIONING RADIOS ASSOCIATED WITH ACCESS POINTS FOR TESTING A WIRELESS NETWORK

CROSS REFERENCE TO RELATED APPLICATIONS

This application claims priority from and is a continuation of international PCT patent application PCT/US14/72363 filed 24 Dec. 2014, which claims priority from U.S. Provisional patent application U.S. 62/016,546 filed 24 Jun. 2014, which is incorporated herein by reference in its entirety.

TECHNICAL FIELD

This application relates to the field of wireless network devices, specifically unique identification of individual radios for targeted testing.

BACKGROUND

A wireless network, e.g., a Wi-Fi (also spelled WiFi or WiFi) network, utilizes technologies that allow an electronic device to exchange data or connect to the internet without wired connection. For example, in a typical WiFi network, a connection is accomplished using microwaves in the 2.4 GHz and 5 GHz frequency bands. The wireless network is termed a wireless local area network (WLAN), in contrast to wired local area network (LAN) where a physical connection to the internet is used; e.g., by using cable, telephone, or Ethernet. In a wireless network, one or more access points (APs) are used to provide network connection to multiple devices. The most commonly used protocol for wireless connection includes but is not limited to the IEEE 802.11 (Wi-Fi) standard protocol.

A home WiFi network typically requires only one access point (AP), which may have one or more radios at different frequencies. During deployment, troubleshooting, or maintenance, there is no need for an operator of such a network to pinpoint which AP is being accessed. Even when the AP broadcasts multiple radio frequencies, the operator can easily detect and measure data associate with different radio frequencies.

What is needed are methods and systems for automatic and uniquely identifying individual APs and radios associated thereto when they operate under the same network.

SUMMARY

The present invention concerns a method of provisioning access point (AP) radios, comprising: via a testing apparatus in communication via a network with a plurality of APs, assigning a unique radio test identifier for an AP in the plurality of APs; and provisioning the AP radio associated with the AP in the plurality of APs with the corresponding unique radio test identifier, wherein the provisioning can be switched on or off. The radio test identifier may be a MAC address or a serial number. This embodiment may append the unique radio test identifier for the AP with a base identifier assigned to the network, further assigning the base identifier, which could be an SSID, to the network. This provisioning of AP radios may be a mode that can be switched on or off. Provisioning AP radios causes storage of the unique radio identifier, storage of the AP identity that is provisioned, and receiving of testing data from at least one AP. This unique radio provisioning information, AP identity, and corresponding testing data may be displayed in a graphical user interface (GUI). In some embodiments, the testing apparatus can be a controller, a distributed controller and an independent testing device.

Systems and methods here for provisioning access points (AP), include, via a testing apparatus in communication with a network and a plurality of APs, receiving a unique identifier, provisioning, by, sending an AP a base identifier, and sending the AP the unique identifier, testing, by, sending the AP a trigger to broadcast the base identifier and the unique identifier. Certain examples include where the unique identifier is unique to each radio associated with the AP, when the AP is configured to have multiple radios operating at different frequencies. Certain examples are further comprising, sending the AP a trigger to broadcast the base identifier and not the unique identifier, and some where the receiving a unique identifier is via the network. In some implementations, the receiving a unique identifier is via the plurality of APs, and in some, the unique identifier is selected from the group consisting of the serial number of the AP, the medium access code (MAC) address of the AP, the physical location of the AP, and a combination thereof.

Some inventive aspects have the base identifier is a service set identifier (SSID). Some have the unique identifier replace the base identifier of the AP radio. In certain examples, the unique identifier is combined with the base identifier of the network. In certain examples, the unique identifier is the same for all radios associated with the AP, when the AP is configured to have multiple radios operating at different frequencies, and in some, each unique identifier associated with each radio of an AP is the frequency range of the radio. Certain examples include via the testing apparatus, causing storage of the unique identifier, and causing storage of the AP identity that is provisioned with the unique identifier. In some examples, via a graphical user interface, they include causing display of the unique identifier and the AP identity that is provisioned with the unique identifier.

In certain examples, the testing apparatus is selected from the group consisting of a controller (e.g., element 140), a distributed controller, an independent testing device, and a combination thereof. And in some, the distributed controller comprises an intelligent AP or an intelligent mobile node. In some examples, the independent testing device is selected from the group consisting of a mobile phone, a digital personal assistant (PDA), a portable networked device, a tablet, a specialized networked testing device, and a combination thereof.

Systems and methods of testing a plurality of access points (APs) in a network, here, include sending, via a testing apparatus in communication with the network and the plurality of APs, a base network identifier to each AP in the network, a unique radio test identifier to each AP in the network, and a command to each AP in the plurality APs, to cause them to broadcast the base network identifier and the respective unique radio test identifiers, and receiving, via a local testing device, testing data correlated to each AP corresponding to each AP unique radio test identifier.

In some examples, the unique radio test identifier is based on the MAC address of an AP. And in some, the unique radio test identifier is the serial number of an AP. Some examples have, via the testing apparatus, receiving the unique radio test identifier for each AP in the network, from the respective AP in the network. And in some examples the testing apparatus is selected from the group consisting of a controller (e.g., element 140), a distributed controller, an independent testing device, and a combination thereof. In certain examples, the distributed controller comprises an intelligent AP or an intelligent mobile node.

In certain examples, the independent testing device is selected from the group consisting of a mobile phone, a digital personal assistant (PDA), a portable networked device, a tablet, a specialized networked testing device, and a combination thereof. In some, the local testing device is selected from the group consisting of a mobile phone, a digital personal assistant (PDA), a portable networked device, a tablet, a specialized networked testing device, and a combination thereof. In some, the testing apparatus and local testing device are the same.

Methods and system for provisioning a unique radio test identifier to an AP in a plurality of access points (APs) in a wireless network, may include a plurality of access points (APs) in a wireless network, a testing apparatus in communication via a network with the plurality of APs, wherein the testing apparatus is configured to, switch on a provisioning mode, send a base network identifier to each AP in the network, send a unique identifier to each AP in the network, send a command to the APs to broadcast the base network identifier and unique identifier.

Some examples have the testing apparatus is selected from the group consisting of a controller (e.g., element 140), a distributed controller, an independent testing device, and a combination thereof. In some examples, the distributed controller comprises an AP or a network interface module. And in some, the independent testing device is selected from the group consisting of a mobile phone, a digital personal assistant (PDA), a portable networked device, a tablet, a specialized networked testing device, and a combination thereof.

In certain examples, the unique identifier is unique to each radio associated with an AP, when the AP is configured to have multiple radios operating at different frequencies. In some examples, the testing apparatus is configured to send the AP a trigger to broadcast the base identifier and not the unique identifier. In certain examples, the unique identifier is sent via the network. In certain aspects, the unique identifier is sent via the plurality of APs.

In some embodiments, the unique identifier is selected from the group consisting of the serial number of the AP, the medium access code (MAC) address of the AP, the physical location of the AP, and a combination thereof, and in some examples, the base identifier is a service set identifier (SSID). In certain inventive aspects, the unique identifier replaces the base identifier of the AP radio, and in some, the unique identifier is appended to the base identifier of the network.

Some examples have the unique identifier as the same for all of the radios associated with that AP, when the AP is configured to have multiple radios operating at different frequencies. In some examples, each unique identifier is associated with each radio of an AP is the frequency range of the radio.

Methods and systems for providing maintenance for a plurality of access points (APs) in a network, may include a plurality of APs in a wireless network, configured to broadcast one or more unique radio test identifiers, a testing apparatus in communication with the plurality of APs, configured to send a command to the plurality of APs to broadcast their one or more unique radio test identifiers, and an application on a local testing device in communication with the plurality of APs, configured to receive transmission data from the plurality of APs and send the transmission data regarding the plurality of APs to the controller.

In some examples, the testing apparatus is selected from the group consisting of a controller (e.g., element 140), a distributed controller, an independent testing device, and a combination thereof. In certain examples, the distributed controller comprises an AP or a network interface module. In some examples, the independent testing device is selected from the group consisting of a mobile phone, a digital personal assistant (PDA), a portable networked device, a tablet, a specialized networked testing device, and a combination thereof.

In some embodiments, the local testing device is selected from the group consisting of a mobile phone, a digital personal assistant (PDA), a portable networked device, a tablet, a specialized networked testing device, and a combination thereof. In certain methods and systems, the testing apparatus and local testing device are the same. Some examples have the unique radio test identifier based on the MAC address of an AP. And in some, the unique radio test identifier is the serial number of an AP.

One of skill in the art would understand that the embodiments disclosed herein, when applicable, can be included in conjunction with any aspect of the invention.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION

Reference will now be made in detail to embodiments, examples of which are illustrated in the accompanying drawings. In the following detailed description, numerous specific details are set forth in order to provide a sufficient understanding of the subject matter presented herein. But it will be apparent to one of ordinary skill in the art that the subject matter may be practiced without these specific details. Moreover, the particular embodiments described herein are provided by way of example and should not be used to limit the scope of the invention to these particular embodiments. In other instances, well-known data structures, timing protocols, software operations, procedures, and components have not been described in detail so as not to unnecessarily obscure aspects of the embodiments of the invention.

Wireless Overview

As noted, in a wireless network (e.g., a WiFi network), one or more access points (APs) are used to provide network connection to multiple devices without wired or other physical connections. It will be understood that, although a WiFi network is often used in the description as an example to illustrate the invention, the methods and systems described herein are applicable to any wireless network. Described herein are methods and systems for automatically and uniquely identifying individual APs that are located within the same wireless network.

Figure 1A:
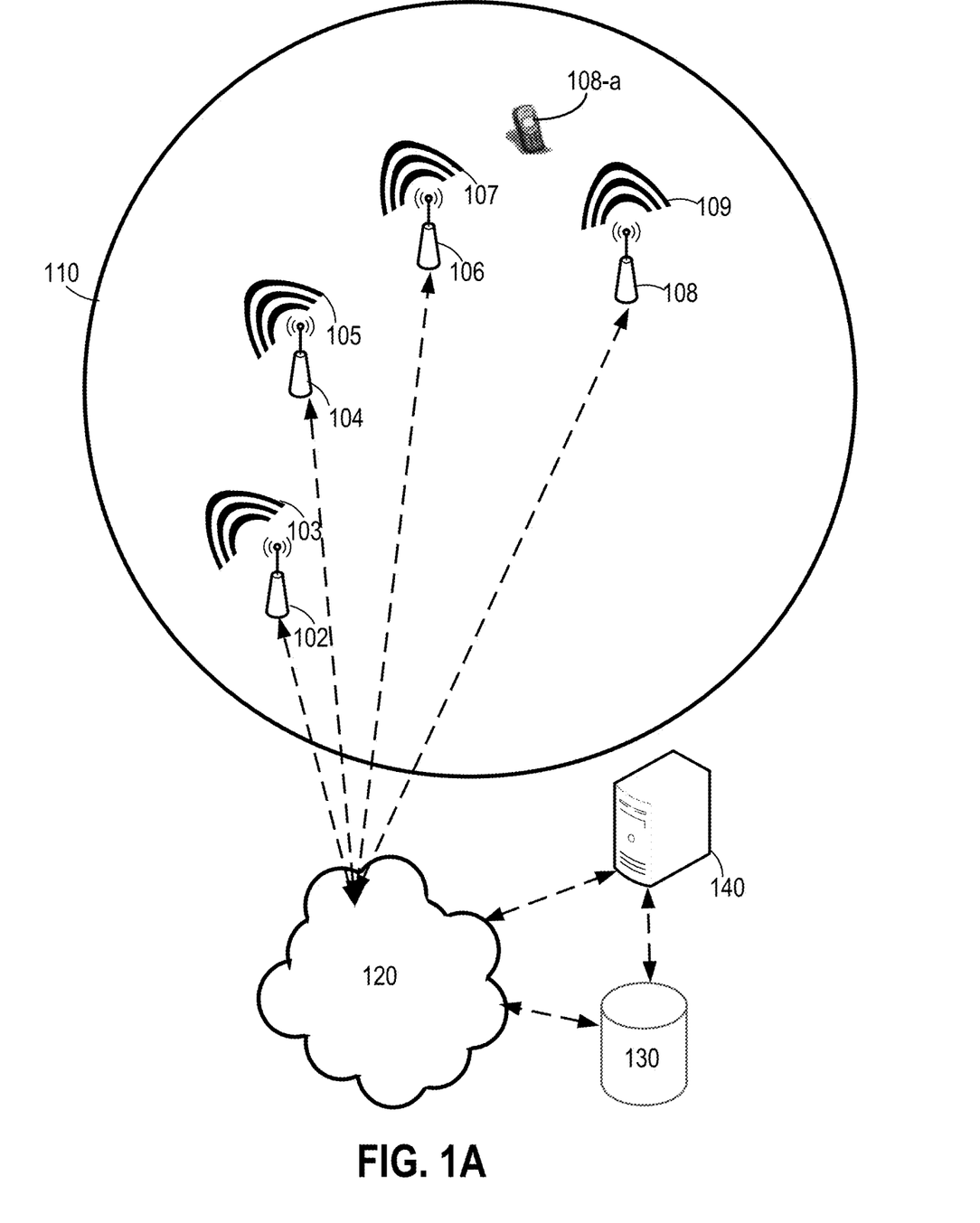
FIG. 1A illustrate an exemplary network diagram with access points according to some embodiments herein.

A WiFi network in an enterprise or urban environment, however, requires multiple access points (APs) to provide coverage over a large area (e.g., elements 102, 104, 106 and 108 in FIG. 1). Under such situations, an operator needs to test each individual AP during testing and maintenance. Additionally, each AP can contain a plurality of radios operating at particular frequencies. The operator may also need to test each individual radio. Because all APs in the same WiFi network broadcast under the same network name, e.g., a Service Set Identifier referred to as an SSID, testing was previously accomplished by leaving the desired AP turned on while turning off all other APs. In a large network, this technique may become unwieldy.

In certain embodiments, each AP can in turn contain one or more radios at different frequencies. During maintenance of the wireless network, an operator may need to perform tests on individual APs. Because each AP in a network operates under a single base network identifier (e.g., a Service Set Identifier or SSID), isolating and testing a radio in a single AP may be useful.

In some examples, a base identifier may be assigned by the network when the WLAN is set up, for example in a provisioning step. The base identifier may be considered a network identifier that can distinguish a particular wireless network from other wireless network. For example, in a large office building, when multiple companies are located in close vicinity to each other, multiple base identifiers or network identifiers may be necessary to allow users to select the appropriate wireless network for connection with their company. Similarly, a public space such as a park, the local coffee shop may provide a pay network, and a local library may provide a free network. The SSIDs of the networks, as broadcast by the APs operated by the coffee shop and library help the users of the client devices to distinguish the networks and choose with which to associate.

Unique Radio Identifiers

FIG. 1A shows an example network embodiment with various APs 102, 104, 106 and 108. In certain examples, all of the APs are connected to the same network 120 and back end such as a testing apparatus (e.g., controller 140) and data storage 130. In such an example network, it may be useful to inform possible clients of the identity of the network. Thus, for example all of the APs in FIG. 1A may broadcast a network base identifier such as an SSID 103, 105, 107, 109 so that users or client devices in range are able to identify the network that they wish to join. Thus, in such an example, on the user display of the client device 108a, the user is able to see a list of SSIDs that APs in range of it are broadcasting. In this way, the user of the client device 108a may select which network to connect to, such as in the examples above, the network operated by the library, company or coffee shop.

The identifying SSID information for any particular network may be sent to the APs from the system, such as from a testing apparatus (e.g., controller 140, a distributed controller or an independent testing device) in communication with a network 120. In such an embodiment, the same SSID is sent, or provisioned, to the APs to broadcast to potential clients to ensure that the clients understand to which network they may connect. But when a client device 108a comes in range of one or more AP, that client device only sees that the particular SSID is available. The client has no visibility as to which AP is broadcasting which SSID. And if all of the APs are broadcasting the same SSID, the client device cannot discern which AP it is choosing to associate to, even if it understands to which network it is associating.

If, on the other hand, in FIG. 1A, the APs each broadcast the same base SSID coupled with a unique identifier appended to it, the client device 108a could then see which network they may join based on the base SSID, but also understand which AP they are receiving a signal from, because of the unique appended identifier. In other words, in some embodiments, the SSID 105 broadcast from AP 104 is different than the SSID 107 broadcast from AP 106, by way of a unique identifier that the client device 108a is able to view. If the user of the client device understands the correlation between the unique identifier and the base SSID and the AP, the user may discern which AP from which it is receiving a signal.

Unique identification of the APs may be achieved by associating each AP with any number of unique identifiers. The terms "unique identifier," "unique radio identifier," "unique test identifier," and "unique radio test identifier" will be used interchangeably. Any identifier that uniquely identifies an AP can be used. Examples of such unique identifiers include but are not limited to a media access control address (MAC address), a serial number of the AP itself, a systematically generated identifier, an identifier explaining the physical location and/or physical attributes of the individual AP and others.

Other identifiers may be used to identify an AP as well.

Exemplary Provisioning System and Testing Apparatus

In one aspect, provided herein are systems and methods for automatically assigning those unique identifiers to individual APs and radios associated thereto, when the APs and radios are all connected to the same wireless network and share the same network ID. An exemplary provisioning system is illustrated in FIGS. 1A and 1B.

Also provided herein is testing apparatus that performs the evaluation of network related activities of individual APs within the network. As used herein, the term "testing apparatus" refers to an apparatus that is capable to recognize APs in a network and/or test the activities of individual APs. For example, a testing apparatus can assign an identifier to an AP, cause the AP to broadcast a pre-assigned identifier, send, receive and record data relating to the network activities of individual APs. In some embodiments, the testing apparatus is the controller of the network system. In some embodiments, the testing apparatus is a distributed controller of the network system. In some embodiments, the testing apparatus is an independent testing device of the network system. In some embodiments, the independent testing device is the same as a local testing device such as a mobile phone, a digital personal assistant (PDA), a portable networked device, a tablet, a specialized networked testing device, and etc.

Figure 1B:
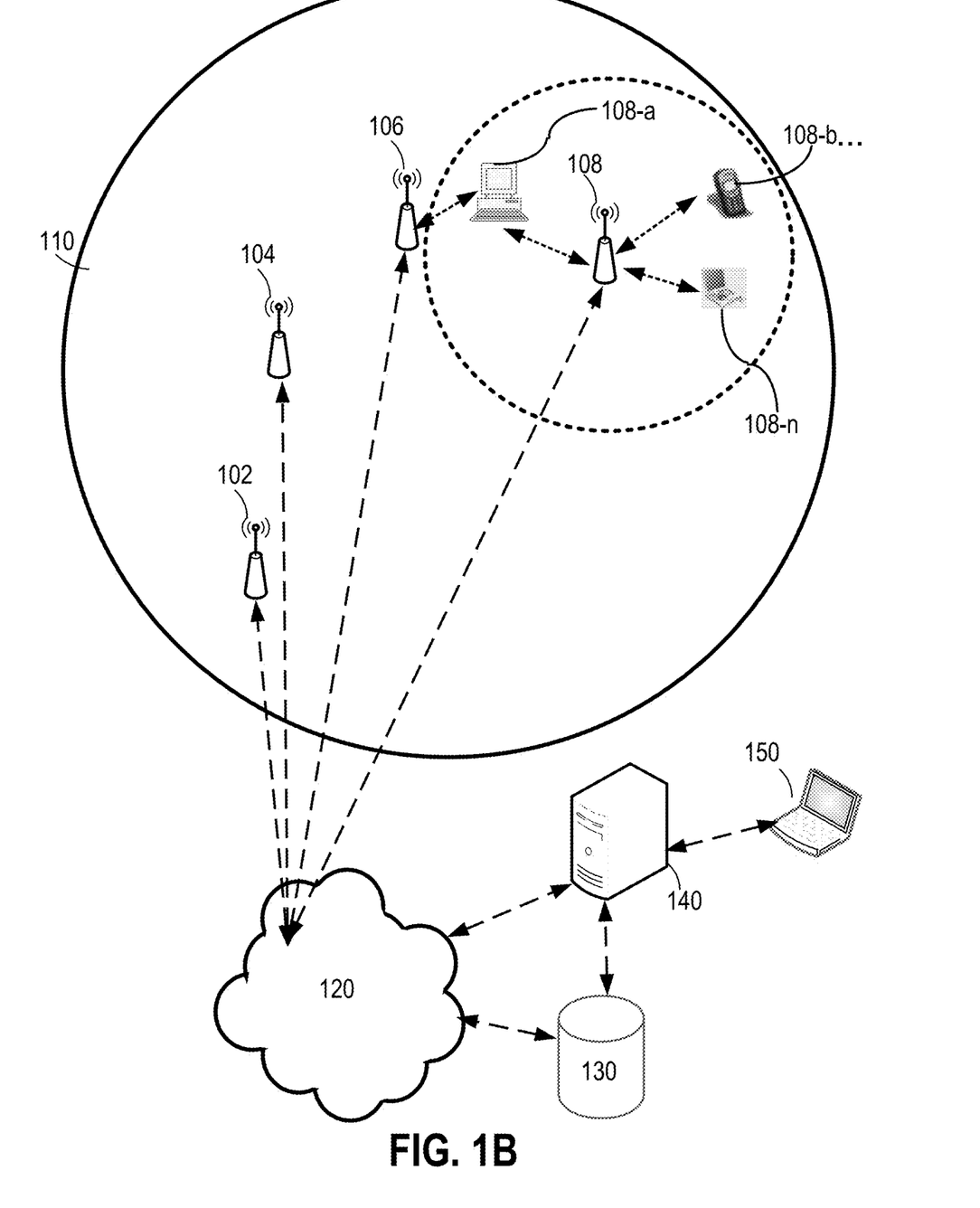
FIG. 1B illustrates an exemplary network diagram for a wireless network with a plurality of access points, according to some embodiments herein.

The functionality and configuration of a controller (e.g., a centralized controller 140) are illustrated in FIGS. 1A and 1B. FIG. 1B depicts another exemplary network to illustrate how such a provisioning mode may be set up. In the example embodiment of FIG. 1B, network 110 is made up of APs 102, 104, 106, 108. APs are connected to, or in communication with a controller 140 through a network 120 (e.g., the internet). In some embodiments, controller 140 sends to and stores information in data storage 130. In some embodiments, controller 140 is located on data storage 130. In some embodiments, a graphical user interface 150 is used by the operator to coordinate turning on the provisioning mode and perform targeted testing. In some embodiments, a graphical user interface 150 is associated with controller 140.

In some embodiments, a system controller includes a single chassis or multi chassis resident in a centralized location, capable of accessing one or more APs. The APs are located either with the central controller or distributed across a large network. Multiple APs have the capability of connecting to one or more network interface modules (NIMs). The NIMs are located in a computer or a device such as in a network appliance or a PDA. The AP aggregates one or more network interface modules and provides advance services, including, for example, quality of service, traffic segregation, and traffic prioritization, etc.

In some embodiments, the functionality of a centralized controller is performed by a distributed controller in a network system. The distributed controller can be a virtual controller. Like the controller, a distributed controller has the capability to get statuses from one or more intelligent APs and intelligent network interface modules within the network and to cooperate with the intelligent components in establishing command and control to provide a scalable, reliable network. The APs have the capability of either working independently or in conjunction with the intelligent controller and the intelligent mobile nodes to deliver advanced services within a scalable wireless network.

In some embodiments the system controller may further include disparate multiple chassis, where the virtual distributed controller functionality is provided in a cooperative virtual distributed manner by one or more components in the network. In such embodiments, the controller functionality is not centralized within a single chassis. Rather, the functionality is distributed amongst the intelligent APs or intelligent mobile nodes. In certain embodiments, a single component (such as one single AP) may be elected to provide the controller functionality for other components. In an alternative embodiment, each component may be elected to provide the controller functionality required for the benefit of downstream intelligent controllers, such as an AP providing the controller functionality to one or more downstream intelligent mobile nodes.

In a virtual distributed controller embodiment, the individual mobile nodes making a communication link analogous to an intelligent controller. However, the request is rather served by the elected virtual distributed controller rather than a single physical controller. The system may interpret the destination of a given controller based on the originating nodes identity. Thus, a given mobile node making a request to a controller would in fact be interpreted differently than a different mobile node making the same request. The virtual controller is composed of one or more intelligent components and thus a given request is processed by the appropriate virtual component.

In traditional networks, as new nodes enter the domain of the existing wireless network, they act as resource sinks in that they require network service resources from the existing wireless network such as routing, forwarding and management. The virtual distributed controller is advantageous in that the new nodes entering the wireless network domain also provide additional resources to the wireless network, such as computational resources and switching resources, and the ability to support network services such as routing, forwarding and management. The use of forwarding with quality and class of service policies further provides the network with additional routes to be able to provide the required service for the nodes within its domain. The virtual distributed controller functionality specifically deals with the distributing the management aspect of the wireless network.

In some embodiments, one or more network interface modules (NIMs) connected to the APs in a network function as independent testing devices. For example, an independent testing device can sense the APs within a certain range and cause them to broadcast their respective unique identifiers. An independent testing apparatus can also receive and record data that represent the network activities of individual APs. In some embodiments, the independent testing device is the same as a local testing device such as a mobile phone, a digital personal assistant (PDA), a portable networked device, a tablet, a specialized networked testing device, and etc.

In some embodiments, a wireless network is identified by a base identifier, for example, a service set identifier (SSID), which is a sequence of characters that uniquely names the wireless local area network (WLAN). An SSID is sometimes referred to as a "network name" or "network ID." As illustrated in FIG. 1B, multiple APs in the same network can have the same network ID. This name allows stations (e.g., devices 108-*a*, 108-*b*, 108-*n* and etc.) to connect to the desired network when multiple independent networks operate in the same physical area. In some embodiments, an SSID is simply the 1-32 byte alphanumeric name.

Figure 2A:
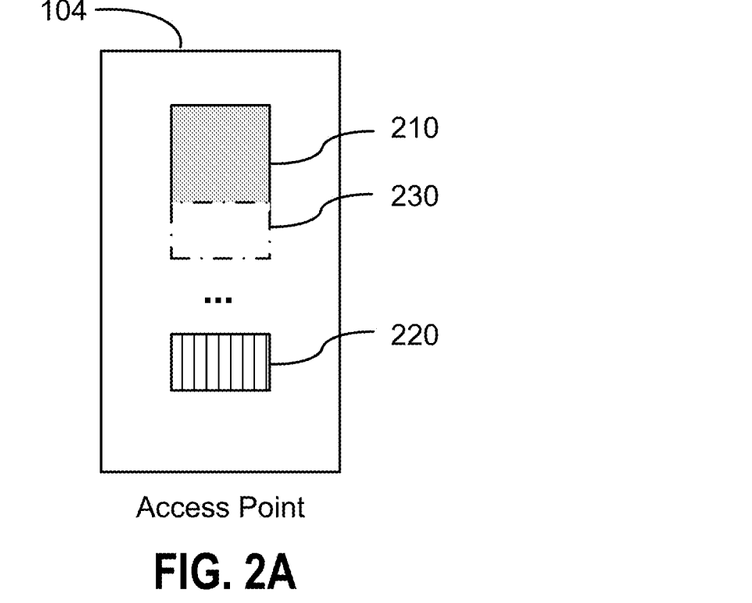
FIG. 2A illustrates exemplary embodiments of an access point (AP) according to some embodiments herein.

FIG. 2A illustrates an exemplary configuration of an AP. An AP as described herein (e.g., element 104) has among other features, a broadcast element 210 through which wireless signals are broadcast, for example, to locations within a physical distance to the AP. In some embodiments, unique identifier element 220 is also implemented in the AP, where one or more unique identifiers associated with one or more radios of the AP are stored.

In some embodiments, the APs (e.g., elements 102, 104, 106, 108) are predetermined such that each AP has an inherent unique identifier before the wireless network is set up.

The unique identifier can be a MAC address, a serial number, or any other kind of predetermined unique identifier. Multiple unique identifiers may be assigned to APs that are equipped with multiple radios to broadcast on different frequencies, where each radio has a unique identifier. For example, a representation of the radio frequency value can be combined with the MAC address, serial number or predetermined unique identifier to render a new unique identifier containing radio frequency information. In some embodiments, the APs are configured to broadcast the unique identifiers after a triggering event (e.g., upon receiving a signal or command from controller 140 of the network). In some embodiments, the APs are configured to broadcast the unique identifiers periodically at a pre-determined time interval.

In some embodiments, all APs broadcast their corresponding unique identifiers in response to a command or trigger from the controller, for example, via identifier broadcast element 230. In some embodiments, identifier broadcast element 230 is a part of the broadcast element 210, for example, one or more unique identifiers are broadcast at the same time as the wireless signal. In some embodiments, the AP may broadcast the unique identifier instead of the regular network identifier such as an SSID. In such embodiments, the unique identifier may temporarily replace the regular network identifier such as an SSID when a testing mode is switched on for the AP or the network. In some embodiments, identifier broadcast element 230 is separated from broadcast element 210. In some embodiments, only a subset of the APs broadcast their corresponding unique identifiers in response to a command from the controller.

Figure 2B:
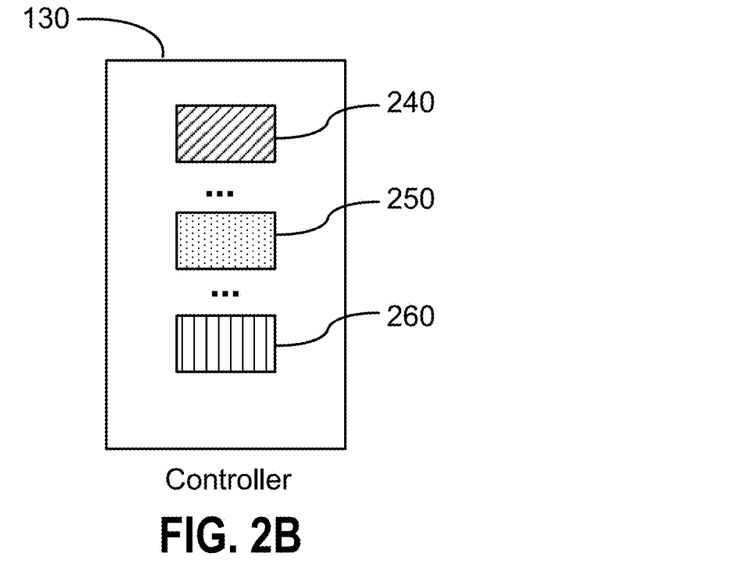
FIG. 2B illustrates exemplary embodiments of a according to some embodiments herein.

An exemplary configuration of a controller is illustrated in FIG. 2B. As provided herein, the controller can operate in any number of modes including but not limited to: a provisioning mode 240, an operating mode 250 and a testing mode 260.

Provisioning mode 240 may be implemented to provide unique identifiers to each AP in the network (e.g., element 110 in FIG. 1B). The provisioning mode can be implemented in an existing network or when setting up a new wireless network. In such embodiments, the network comprises multiple APs (e.g., elements 102 through 108 in FIG. 1B) and a controller (e.g., element 130) that are in communication with each other via a network connection. Once in the provisioning mode, the controller may assign a unique identifier to each radio associated with each AP. In some embodiments, the controller detects or receives unique identifier information from each individual APs. In some embodiments, unique identifiers associated with individual APs are communicated from the APs to the controller pro-actively, for example, as a part of the set up process of the network. In some embodiments, unique identifiers associated with individual APs are communicated from the APs to the controller reactively, for example, upon receiving a command from the controller.

Operating mode 250 may be implemented to maintain normal operation of the wireless network. In some embodiments, the wireless network is in an operating mode when there is no need for individual APs to broadcast their individual unique identifiers. In such embodiments, the controller may instruct the APs in the same wireless network to broadcast the same network name, e.g., an SSID.

Testing mode 260 may be implemented when individual APs need to be distinguished from each other, for example, when maintenance and repair of the APs may be needed.

In some embodiments, the provisioning mode, operating mode, and testing mode are implemented as alternatives to each other. In some embodiments, combinations of modes are implemented, for example, provisioning and operating modes, provisioning and testing modes, operating and testing modes, or provisioning, operating and testing modes.

Also provided in some embodiments of the system is a local mobile testing device 160. A local testing device is designed to be moved to different locations within wireless network 110, for example, at places near different APs to evaluate their performance. Local testing device 160 may be configured for any number of functionalities including at least one of, but not limited to: 1) detecting the unique identifiers for individual APs via an element 270; 2) receiving testing data from a given AP after one or more unique identifiers are detected for radios associated with the particular AP; 3) bundling the data received with the corresponding unique identifier. For example, data received via a 5 GHz or 2.4 GHz frequency wireless band may be bundled with the unique identifier corresponding to the perspective band.

Figure 2C:
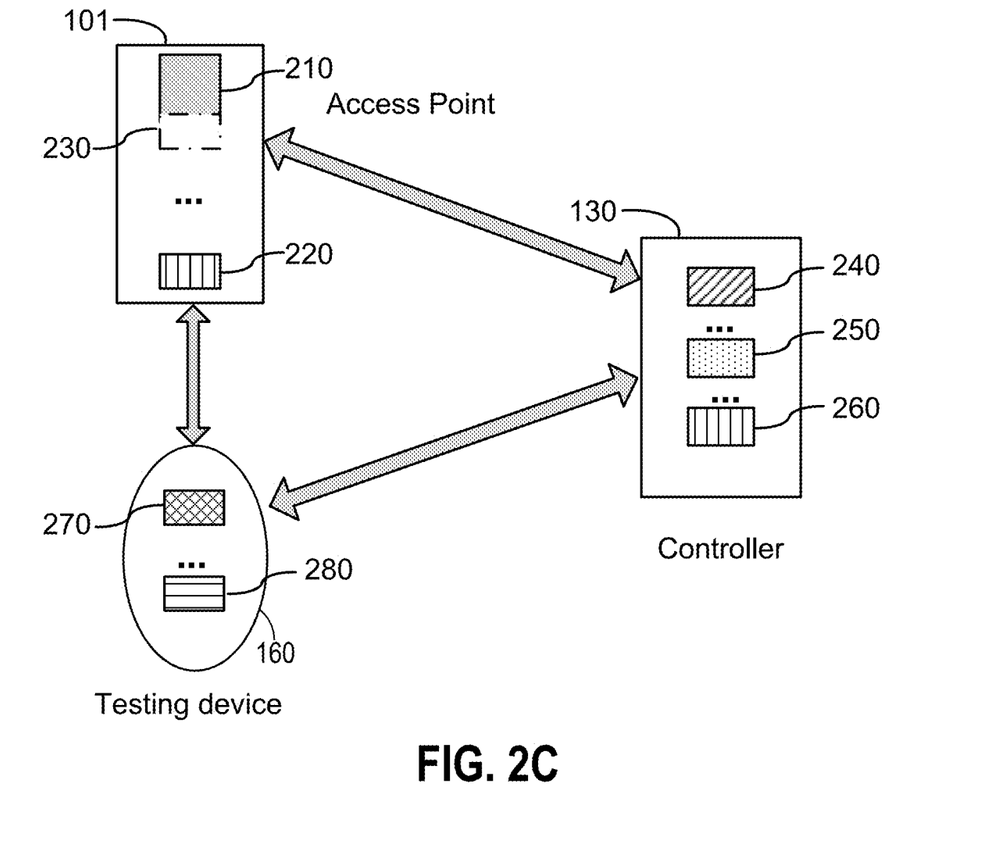
FIG. 2C illustrates exemplary embodiments of an interaction diagram of an AP, a controller and a local testing device according to some embodiments herein.

FIG. 2C depicts an exemplary configuration of the system that may be used for testing individual APs. In the system, controller 140 and an AP (e.g., element 104) communicate with each other, for example, an AP sends its unique identifier to the controller or receives a unique identifier assignment from the controller. Also, for example, once the unique identifier is assigned, the controller may send a command to the AP to trigger the broadcasting of the unique identifier by the AP. Local testing device 160 in turn may communicate with the AP to receive the unique identifier broadcast by the AP, for example, via element 270. In addition, local testing device 160 may also receive testing data from the AP via element 280. In some embodiments, the testing data are transferred to controller 140. In some embodiments, testing data are further transferred to a remote data server for processing and analysis.

In some embodiments, information concerning unique identifiers and the corresponding APs or AP radios are stored locally on the controller. In some embodiments, information concerning unique identifiers and the corresponding APs or AP radios are sent and stored on remote data storage 130 and/or cloud storage. In some embodiments, for example in the testing mode, the controller stores testing data concerning unique identifiers and the corresponding APs or AP radios locally on the controller 140 or sends the data to remote data storage 130.

More Exemplary Methods and Systems

In some example embodiments, provided herein, are methods and systems for automatically and uniquely identifying individual APs and radios associated thereto, when the APs and AP radios are all connected to the same wireless network. Also provided herein are methods and systems for testing and evaluating the performance of individual APs or AP radios within the same wireless network, by using the unique radio test identifiers associated with the APs.

Figure 3:
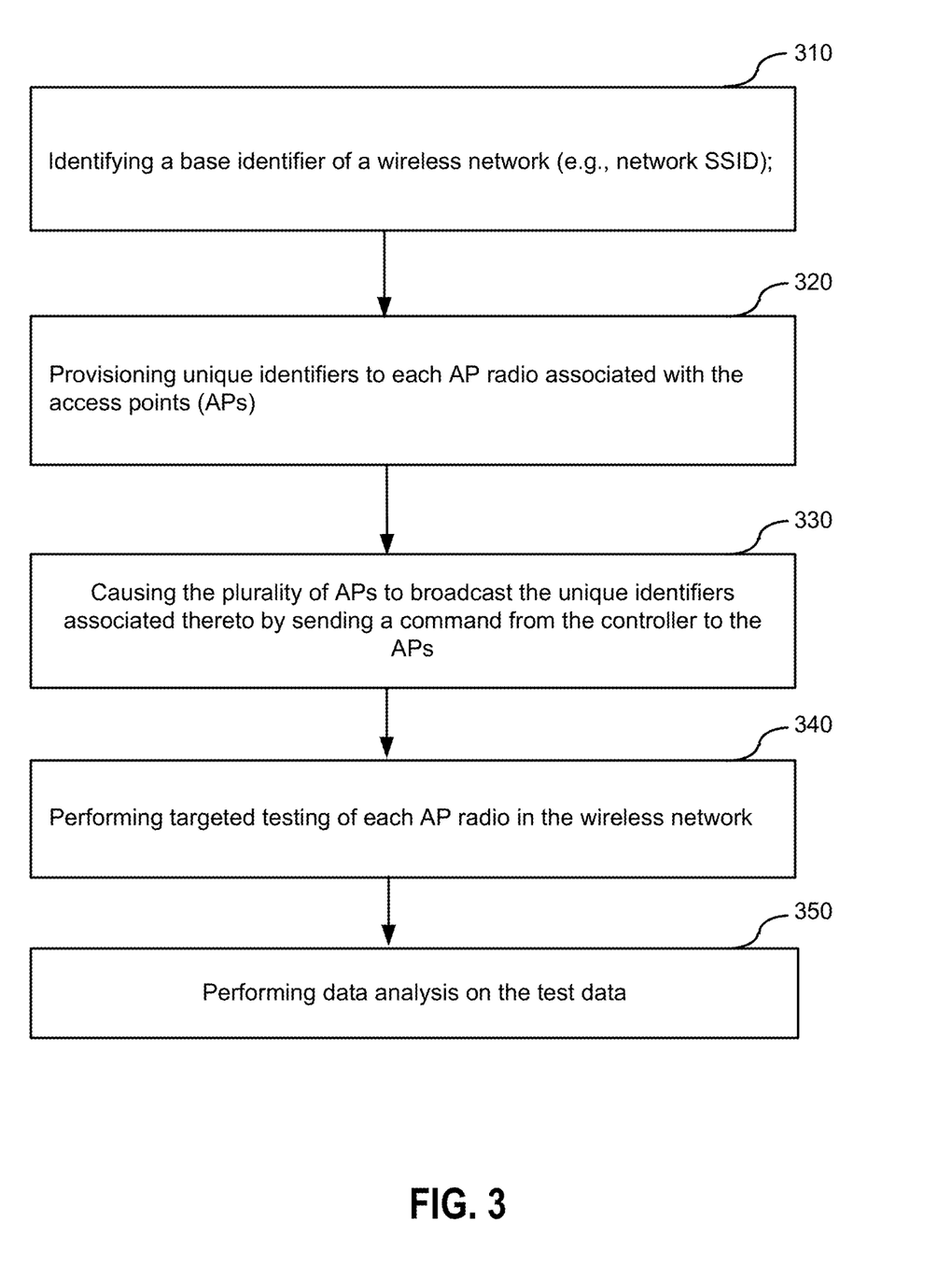
FIG. 3 depicts a flow chart illustrating exemplary methods for implementing the present invention according to some embodiments herein.

FIG. 3 illustrates an exemplary overall process for provisioning unique identifiers to individual APs and methods for utilizing the unique identifiers after they have been provisioned. It is understood that the process steps outlined in FIG. 3 can but do not necessarily occur in the order listed. Further, in some embodiments, each step in FIG. 3 corresponds to a multiple-step method or process.

Step 310: Base Identifier of A Wireless Network

At step 310, a base identifier of the wireless network at issue is identified. For example, as depicted in FIG. 1B, multiple APs are connected within the same wireless network. In general, it is possible that a client device (e.g., 108-a) can be located near, and therefore be in range of more than one AP (e.g., device 108-a can receive signals from both AP 106 and AP 108). However, from a client devices' perspective, there is no need to make distinction among the different APs, as long as the client device is connected to the network. In certain embodiments, assigning the same based identifier, e.g., an SSID, may be advantageous in a WLAN set up because users of client devices can quickly identify the APs that belong to the same wireless network.

As described above, a base identifier may be assigned by the network administrator, via a controller or individually by AP, when the WLAN is set up, for example in a provisioning step. In some embodiments, the base identifier may be pre-determined and recognized by the controller after the network has been established. The base identifier may be considered a network identifier that can distinguish a particular wireless network from other wireless network. For example, in a large office building, when multiple companies are located in close vicinity to each other, multiple base identifiers or network identifiers may be necessary to allow users to select the appropriate wireless network for connection.

Step 320: Provisioning Unique Identifiers

At Step 320 and as described hereinabove, a controller may be used to provision unique identifiers to the APs. In some embodiments, when the provisioning mode may be turned on for the controller, the controller accesses each individual APs and extracts one or more unique identifiers from the AP. In some embodiments, pre-determined unique identifiers are broadcast by the APs and received by the controller. In some embodiments, the controller systematically assigns unique identifiers to the individual APs.

In some embodiments, methods provided herein push a configuration item to the APs to augment their SSID with a unique identifier (e.g., the MAC address or serial number of the AP and etc.) thus allowing the tester to see which AP the test device is measuring at any given time. This may help avoid manual entry of individual AP SSIDs and avoids cumbersome work-arounds like turning off all the APs not being tested.

In some embodiments, the AP or a radio associated thereto broadcasts its unique radio identifier in place of the network SSID. The unique radio identifier is then received and processed by a controller (e.g., element 130 in FIG. 1B) via a network (e.g., a cloud network 120). In some embodiments, the AP or radio also broadcasts the unique radio identifier at the same time as the network SSID, allowing an operator to perform testing while users maintain access to the WiFi network. In some embodiments, the configuration item could flip back and forth between the base SSID mode and this testing mode with unique radio identifier for each radio in each AP.

In some embodiments, a controller 140 may have a provisioning option to systematically assign unique identifiers to each AP or radio. This provisioning option may be turned on or off, e.g., by an operator or system administrator. When the provisioning option is turned on, the controller may assign each APs a unique identifier, such as a unique SSID, which replaces the network SSID. The controller may assign each AP a unique SSID by using the network SSID and appending the serial number of the AP to the network SSID. In another embodiment, the controller may assign each AP a unique SSID by appending the MAC address (media access control address) of the AP to the network SSID. In yet another embodiment, the controller may further assign each radio in each AP a unique SSID by appending the frequency of that particular radio to the unique AP SSID. For example, radio frequencies corresponding to a 2.4 GHz or 5 GHz wireless bands will be each have a unique identifier in which the frequency value is embedded.

In an alternate embodiment, the APs 102, 104, 106, 108 in a WiFi network may be connected to a network, such as a cloud network 120 and/or internet. The AP may have a provisioning option to systematically assign unique identifiers to itself or its radios. This provisioning option may be turned on or off by the operator. In such an embodiment, when the provisioning option is turned on, the AP assigns itself a unique SSID. The AP may assign itself a unique SSID by using the network SSID and appending the serial number of the AP to the network SSID. In another embodiment, the AP may assign itself a unique SSID by appending the MAC address (media access control address) of the AP to the network SSID. In yet another embodiment, the AP may assign its radios a unique SSID by combining the frequency of that particular radio with the unique AP SSID. For example, the radio frequency can be appended to the unique AP S SID.

In some embodiments, the AP may broadcast the original base identifier (e.g., network SSID) as well as the unique identifier (e.g., AP SSID).

When the provisioning mode is turned off, unique identifier (e.g., AP SSID) of each AP or AP radio reverts back to the original base identifier (e.g., network SSID).

Step 330: Testing Mode

A method for testing and evaluating the performance of individual APs or AP radios within the same wireless network, by using the unique radio test identifiers associated with the APs is summarized at Step 330. In such embodiment examples, unique identifiers have been assigned or previously provided to the individual APs or AP radios.

The method involves the coordination between the APs and the controller, or other central entity, so that they both initiate a testing mode. Testing mode can be initiated while the normal functionalities of the wireless network are maintained, including those of the APs, controller, network connection, remote server, monitor and etc. In some embodiments, the controller initiates the process by first entering testing mode or turning on the test mode. The controller may then send a signal or command to multiple APs so that testing mode on these APs are also initiated. In some embodiments, all APs in the wireless network are instructed to enter the testing mode. In some embodiments, only a portion of the APs in the wireless network are instructed to enter the testing mode; for example, in a large wireless network, the APs can be instructed to enter testing mode in different groups or sections.

Once an AP enters testing mode, it may start to broadcast one or more unique identifiers associated with the particular AP. Multiple unique identifiers can be broadcast if the AP is equipped to broadcast multiple wireless signals.

In some embodiments, the AP may broadcast the original base identifier (e.g., network SSID) as well as the unique identifier (e.g., AP SSID).

When the provisioning mode is turned off, unique identifier (e.g., AP SSID) of each AP or AP radio may reverts back to the original base identifier (e.g., network SSID).

Step 340: Targeted Testing of Individual APs

A method for further testing and evaluating the performance of individual APs or AP radios within the same wireless network, by using the unique radio test identifiers associated with the APs is summarized at Step 340.

The unique identifiers broadcast by the individual APs or AP radios may be received by a mobile testing device. The device can be any portable device that can be used to detect the unique identifiers for individual APs and AP radios and data associated therewith. Exemplary local testing devices include but are not limited to a mobile phone, a digital personal assistant (PDA), a portable networked device, a tablet, a specialized networked testing device, and etc. In some embodiments, testing data recorded for a particular AP or AP radio is automatically recorded on the local testing device as being affiliated with the particular AP or AP radio. In some embodiments, the local testing device associate the testing data with a particular AP or AP radio.

In some embodiments, the testing data are stored locally on the local testing device. In some embodiments, the testing data are sent to and stored on the controller. In some embodiments, the testing data are sent to and stored on a remote server, directly from the local testing device or indirectly from the controller.

In some embodiments, an application, installed on a local testing device may be used. Such an application may be used to coordinate storing data about the APs, the SSIDs, the unique identifiers, the total number of APs to be tested, or any number of other things. Such an application could coordinate testing with the APs and/or controllers throughout a testing environment.

Step 350: Data Analysis

In some embodiments, data analysis may take place on the local testing device. In some embodiments, data analysis takes place on the controller and/or in the APs themselves. In some embodiments, data analysis takes place on the remote server. Because the testing data are associated with the unique identifiers with individual APs and AP radios, a user can determine, test and evaluate the performance of a particular AP or AP radio without turning off the other APs or AP radios.

Figure 4:
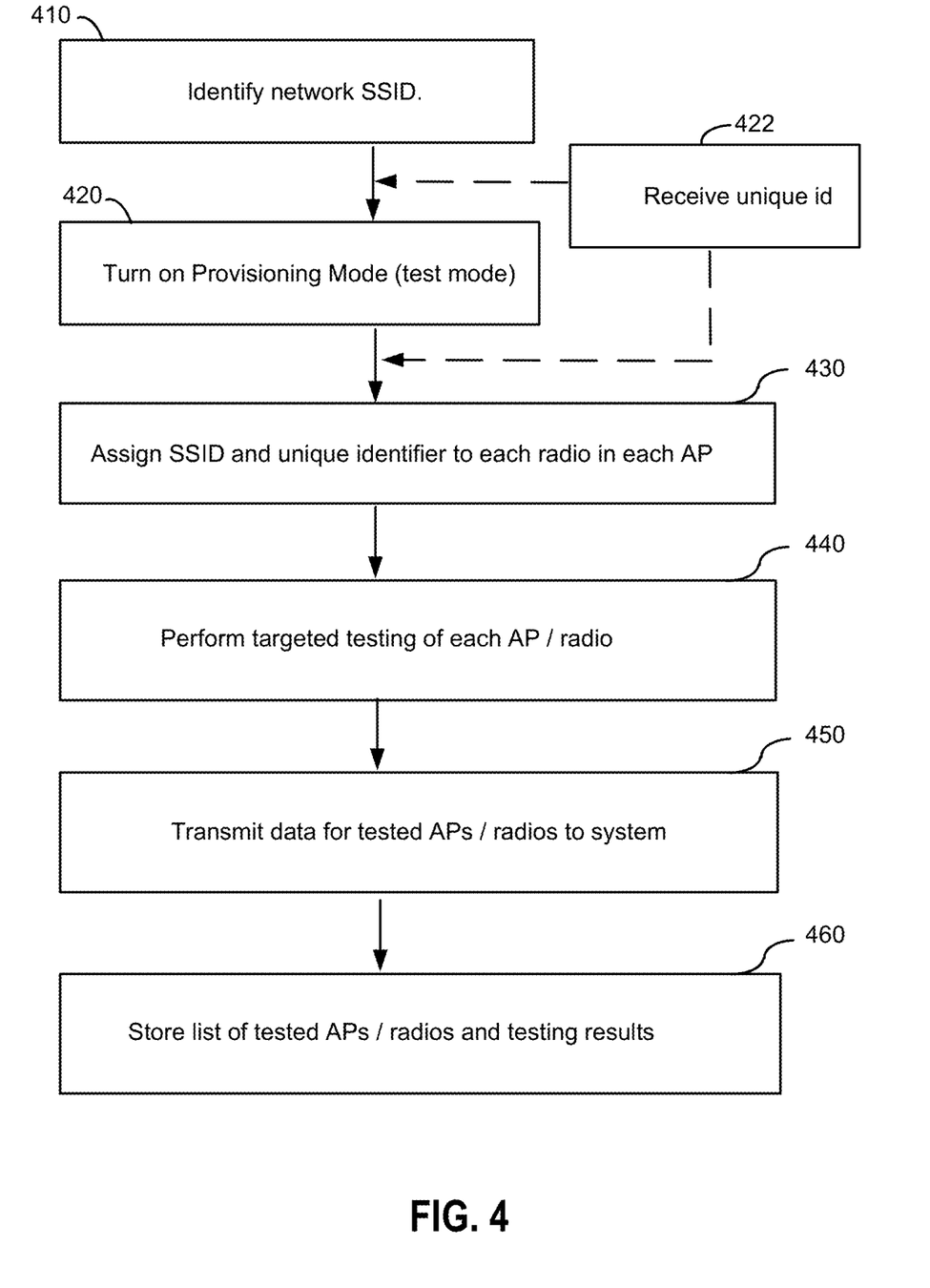
FIG. 4 depicts a flow chart illustrating another exemplary method for implementing the present invention according to some embodiments herein.

FIG. 4 is a flow chart illustrating example embodiment steps by which a unique SSID may be assigned to each radio in the network to perform testing, the results of which may be stored in a server. In the example, the system first identifies a network identification such as an SSID 410. Then the Provisioning Mode is turned on 420. In some embodiments, through a graphical user interface (GUI), the operator can turn on the provisioning mode via the system, via an application on the local testing device, or some combination of them. At some point, the system receives a unique id 422 from the AP itself, from a stored list of identifiers, or from the network. Then the unique id and SSID is assigned to each radio. After assignment of the SSID and unique id to each radio, the testing may be performed 440 of the various radios. Because each radio is provisioned with a unique id as well as the SSID, the local testing device is able to discern the various APs/radios from which the signals are emanating. The transmit data for each tested radio may then be transmitted to the system 450. The system may then store 460 the list of tested APs, radios, and the test results.

CONCLUSION

As disclosed herein, features consistent with the present inventions may be implemented via computer-hardware, software and/or firmware. For example, the systems and methods disclosed herein may be embodied in various forms including, for example, a data processor, such as a computer that also includes a database, digital electronic circuitry, firmware, software, computer networks, servers, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as 1PROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, and so on).

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of provisioning access points (AP), comprising:
via a testing apparatus in communication with a plurality of APs,
   wherein each AP includes a first and second radio, each configured to broadcast at a different frequency;
   receiving, from a back end server, a first and second unique identifier via the testing apparatus,
   wherein the first and second unique identifiers is selected from the group consisting of an identifier indicative of a physical location of an AP, and an identifier indicative of a frequency of the first and second radio;
   sending the AP, in the plurality of APs, via the testing apparatus, an original base network identifier; and
   sending, via the testing apparatus, the AP the first and second original unique identifier for each of the first and second radio in the AP;
testing, by,
   sending the AP instructions, via the testing apparatus, to enter a testing mode;
   sending all the AP, via the testing apparatus, a trigger to broadcast a triggered base network identifier and respective triggered unique identifiers on either the first or second radio in the AP;
   receiving, by the testing apparatus, from all the APs, the triggered base network identifier, and the triggered unique identifiers on either the first or second radio of the AP,
   wherein the unique identifiers are not transmitted by the APs unless in the testing mode;
   comparing the triggered base network identifier and the original base network identifier;
   discerning, by the testing apparatus, which radio of which AP the triggered unique identifiers are emanating; and
   transmitting testing data for the discerned radio to the back end server for storage.

2. The method of claim 1, further comprising,
   sending the AP a trigger to broadcast the base network identifier and not the unique identifier.

3. The method of claim 1, wherein the receiving a unique identifier is via a back end server via a network.

4. The method of claim 1, wherein the unique identifier replaces the base network identifier of the AP radio.

5. The method of claim 1, wherein the unique identifier is combined with the base network identifier of the network.

6. The method of claim 1, wherein each unique identifier associated with each radio of an AP is the frequency range of the radio.

7. The method of claim 1, wherein the testing apparatus is selected from the group consisting of a controller a distributed controller, an independent testing device, and a combination thereof.

8. The method of claim 7, wherein the distributed controller comprises an intelligent AP or an intelligent mobile node.

9. The method of claim 1 wherein the plurality of APs run a virtualized distributed controller for routing, forwarding and management.

10. A method of testing a plurality of access points (APs) in a network, the method comprising:
   sending, via a testing apparatus in communication with the network and the plurality of APs,
   a base network identifier to an AP in the network,
      wherein the AP includes a first and second radio, each configured to broadcast at a different frequency;
   sending, via the testing apparatus, an original unique radio test identifier for each of the first and second radio for the AP in the network,
      wherein the first and second original unique identifiers is indicative of a physical location of the AP;
   sending the AP, via the testing apparatus, instructions to enter a testing mode; and
   sending, via the testing apparatus, a command to each AP in the plurality APs, to cause them to broadcast their respective base network identifier and the respective first and second unique radio test identifiers on the respective first and second radio,
      wherein the unique identifiers are not transmitted by the APs unless in the testing mode;
   receiving, by the testing apparatus, from the AP, a triggered unique identifier from each of the respective first and second radios of the respective APs;
   discerning, by the testing apparatus, which radio of which AP the triggered unique identifiers are emanating; and
   transmitting testing data for the discerned radio to the back end server for storage.

11. The method of claim 10, further comprising, via the testing apparatus,
   receiving the unique radio test identifier for each AP in the network, from the respective AP in the network.

12. The method of claim 10, wherein the testing apparatus is selected from the group consisting of a controller, a distributed controller, an independent testing device, and a combination thereof.

13. The method of claim 12, wherein the distributed controller comprises an intelligent AP or an intelligent mobile node.

14. The method of claim 10 wherein the plurality of APs run a virtualized distributed controller for routing, forwarding and management.

15. A system for provisioning a unique radio test identifier to an AP in a plurality of access points (APs) in a wireless network, comprising:
   a plurality of access points (APs) in a wireless network,
      wherein each AP includes a plurality of radios, each configured to broadcast at a different frequency;
   a testing apparatus in communication via a network with the plurality of APs, wherein the testing apparatus is configured to switch on a provisioning mode;
   the testing apparatus configured to, send an original base network identifier to an AP, among the plurality of APs in the network;
   the testing apparatus configured to, send to the AP in the network, an original unique identifier for each of the plurality of radios in the AP;
   the testing apparatus configured to, send each AP instructions to enter a testing mode;

the testing apparatus configured to receive from each AP, a triggered unique identifier from each of the respective first and second radios of the respective APs, wherein the unique identifiers are not transmitted by the APs unless in the testing mode;

the testing apparatus configured to discern which radio of which AP the triggered unique identifiers are emanating; and the testing apparatus configured to transmit testing data for the discerned radio to the back end server for storage.

16. The system of claim 15, wherein the unique identifier is unique to each radio associated with the AP, when the AP is configured to have multiple radios operating at different frequencies.

17. The system of claim 16, wherein each unique identifier associated with each radio of an AP is the frequency range of the radio.

* * * * *

UNITED STATES PATENT AND TRADEMARK OFFICE
CERTIFICATE OF CORRECTION

PATENT NO. : 10,595,269 B2  
APPLICATION NO. : 15/388290  
DATED : March 17, 2020  
INVENTOR(S) : William S. Kish Page 1 of 1

It is certified that error appears in the above-identified patent and that said Letters Patent is hereby corrected as shown below:

In the Specification

Column 11, Line 67: Please correct "AP S SID." to read -- AP SSID. --

In the Claims

Column 15, Line 62, Claim 7: Please correct "controller a" to read -- controller, a --

Signed and Sealed this  
Fourth Day of August, 2020

Andrei Iancu  
*Director of the United States Patent and Trademark Office*